J. STOLIKER.
Wheel.
No. 50,425.
Patented Oct. 10, 1865.
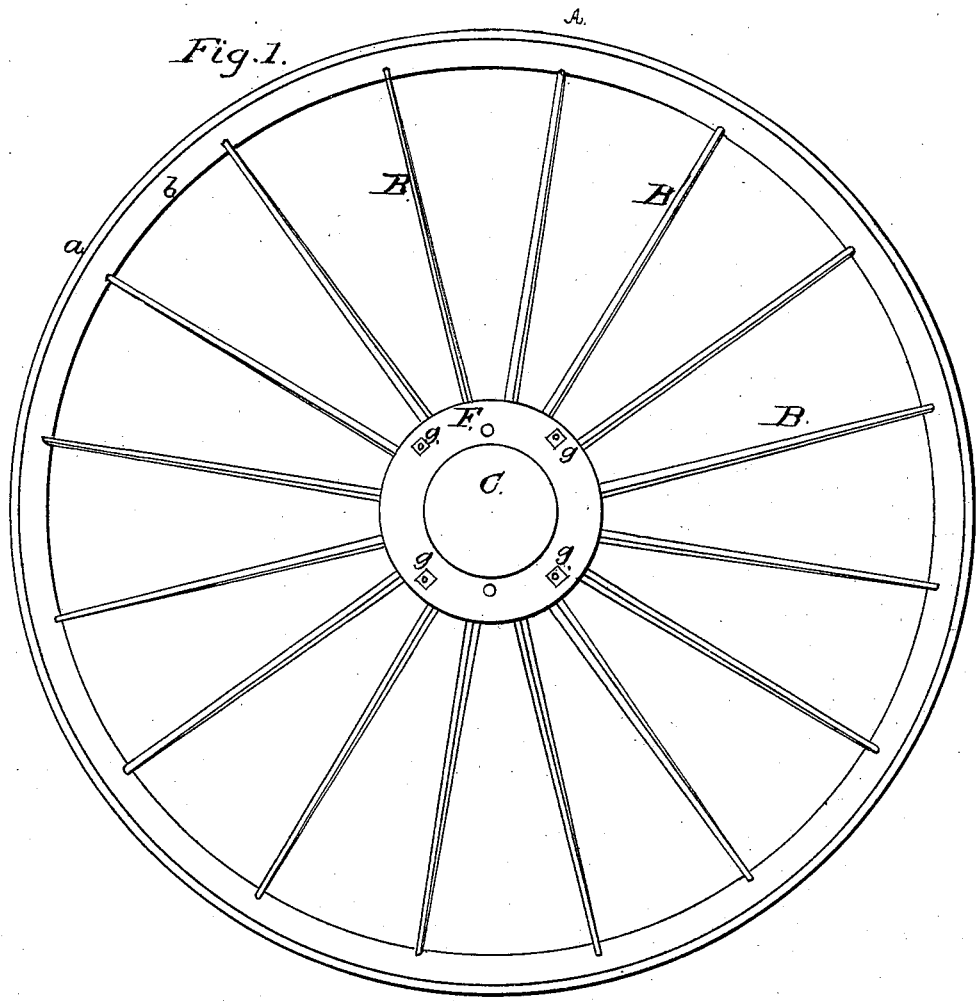
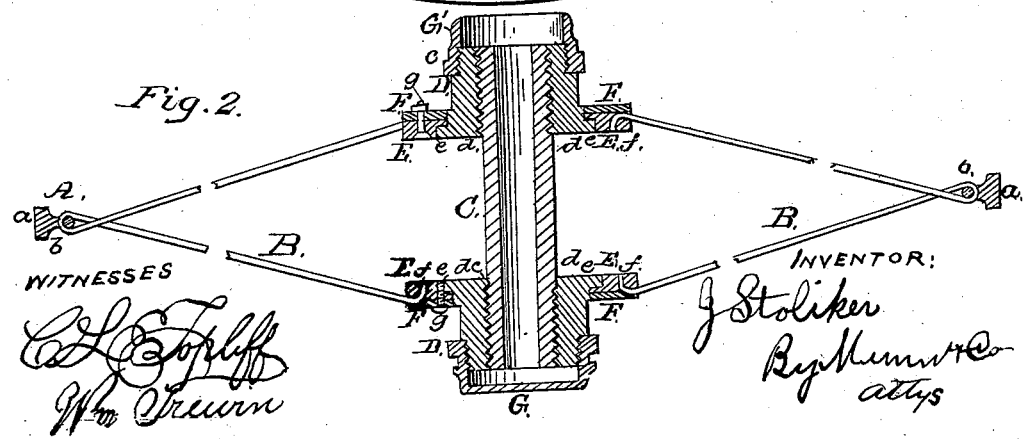

UNITED STATES PATENT OFFICE.

JOSEPH STOLIKER, OF PINE RUN, MICHIGAN, ASSIGNOR TO HIMSELF AND J. U. McKENZIE, OF SAME PLACE.

IMPROVEMENT IN WHEELS.

Specification forming part of Letters Patent No. 50,425, dated October 10, 1865.

*To all whom it may concern:*

Be it known that I, JOSEPH STOLIKER, of Pine Run, in the county of Genesee and State of Michigan, have invented a new and useful Improvement in Wheels for Vehicles and for other Purposes; and I do hereby declare that the following is a full, clear, and exact description of the same, which will enable those skilled in the art to make and use it, reference being had to the accompanying drawings, forming part of this specification, in which—

Figure 1 is a side view of my invention; Fig. 2, a central section of the same.

Similar letters of reference indicate corresponding parts.

This invention consists in an improved mode of constructing metal wheels for vehicles and other purposes, and has for its object lightness and durability, and also economy in manufacture. It is designed to supersede the ordinary wooden wheels now used for vehicles, as well as the combined wooden and iron wheels used for various purposes.

I construct the tire and felly A of the wheel of wrought-iron or steel and of T-form in its transverse section, as shown clearly in Fig. 2, $a$ being the rim or tread, and $b$ the flange projecting inward and centrally from $a$. This flange $b$ has a series of holes drilled through it at equal and suitable distances apart to admit of the spokes B passing through it. These spokes are contructed of wire, (iron or steel,) each wire forming in effect two spokes, the wires, after being passing through the holes in the flange $b$ of the rim or tire, being crossed at the inner edge of the flange, as shown clearly in Fig. 2.

C is the hub of the wheel, which may be of wrought or cast iron or of other metal, and having a screw-thread, $c$, on each end to receive nuts D D, the screw-threads $c$ having opposite pitches, so that when the nuts D are turned simultaneously they will approach or recede from each other, the thread $c$ projecting beyond the periphery of the hub to admit of the nuts being screwed together in contact when required. These nuts D D have each a flange, $d$, at their inner ends, and these flanges project out sufficiently to admit rabbets $e$ being turned in them, as shown in Fig. 2, and on the flange of each nut a ring, E, is fitted, the shoulder formed by the rabbets $e$ serving as bearings for the rings. These rings E are drilled with holes at suitable distances apart to receive the inner ends of the spokes B, which ends are bent at right angles, as shown at $f$, and inserted in the holes, and are secured therein by annular plates F, also fitted on the flanges of the nuts at the outer side of the rings E, and secured thereto by bolts $g$. The lower ends of the spokes are inserted in the rings E when the nuts D D are moved or adjusted at the center of the hub, and the spokes are strained or brought to a proper state of tension by screwing outward the two nuts D D simultaneously. This forms a double-spoked wheel with a double dish, and admits of a wheel being applied to either side of a vehicle.

On the outer ends of the nuts D D there are screw-threads cut to receive nuts G G', one of which, G, serves as a cap for the nut which secures the hub on the axle, a space being allowed between the end of the nut G and the hub C to receive said nut. The other nut, G', serves as a back band for the collar at the inner end of the arm of the axle, on which arm the hub turns, said nut having an open end to admit of the arm passing through it. This wheel may be economically constructed, and will sustain any reasonable weight. It cannot possibly have its dish reversed as a single-dish wooden wheel, and it possesses the advantage of being applied to either side of a vehicle, and as the spokes are all strained or drawn taut by the adjustment of the nuts D D, as described, it follows, as a matter of course, that the rim or fellies will be prevented from being bent or indented, as a blow or concussion received at one side will be resisted by the spokes at right angles to the line in which the blow or concussion is given. Hence it will be seen that all the spokes of the wheel serve to support the load to which the wheel is subjected, the lower spokes, or the ones below the hub, not being alone depended upon for that purpose, as is the case with the ordinary wooden wheels.

Having thus described my invention, I claim as new and desire to secure by Letters Patent—

1. A metallic wheel for vehicles and for other purposes, provided with spokes arranged or applied to the rim or tire so as to pass through a flange of the same, and connected at their inner inner ends to adjustable nuts or bosses on the hub, arranged in such a manner that the spokes may be strained or brought to a proper state of tension by spreading apart the nuts or bosses, substantially as described.

2. The crossing of the wires forming the spokes and the securing of the inner ends of the same to rings E on the nuts D D, in the manner substantially as set forth.

3. The combination of the rim or tire A, spokes B, hub C, nuts D D, rings E, and plates F with the nuts G G', all arranged substantially as and for the purpose specified.

The above specification of my invention signed by me this 26th day of July, 1865.

JOSEPH STOLIKER.

Witnesses:
JAMES A. SHELDEN,
THOMAS OLIVER.